United States Patent Office 3,440,803
Patented Apr. 29, 1969

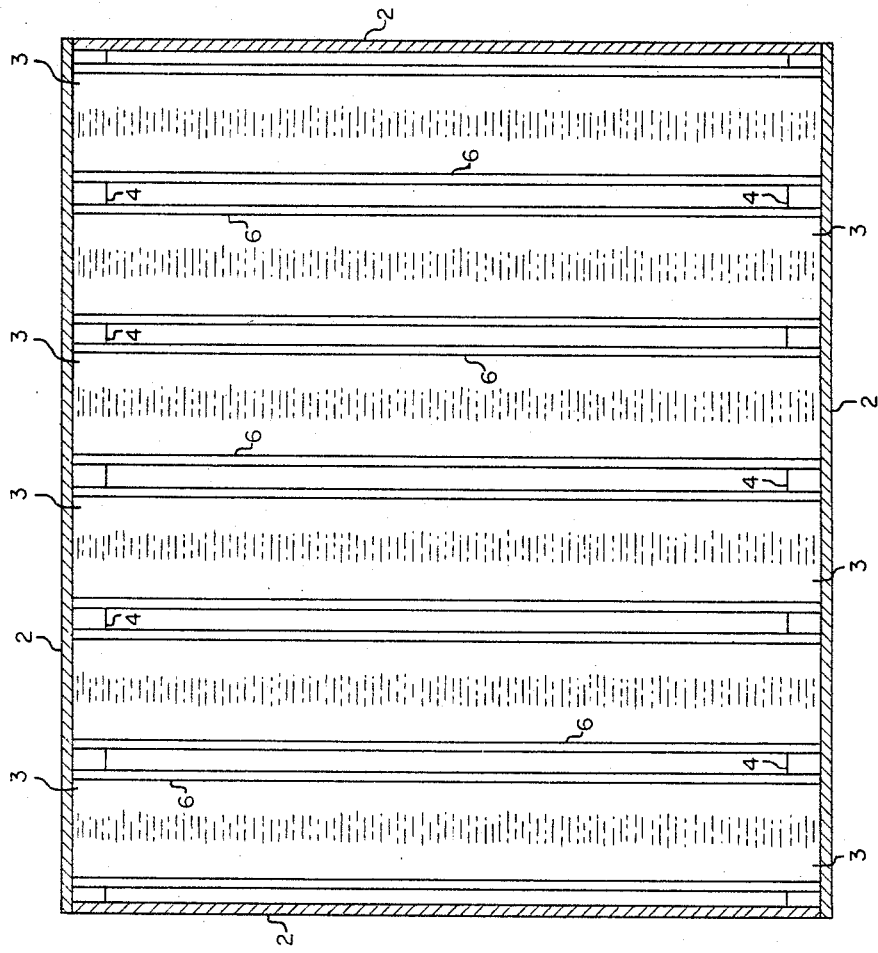

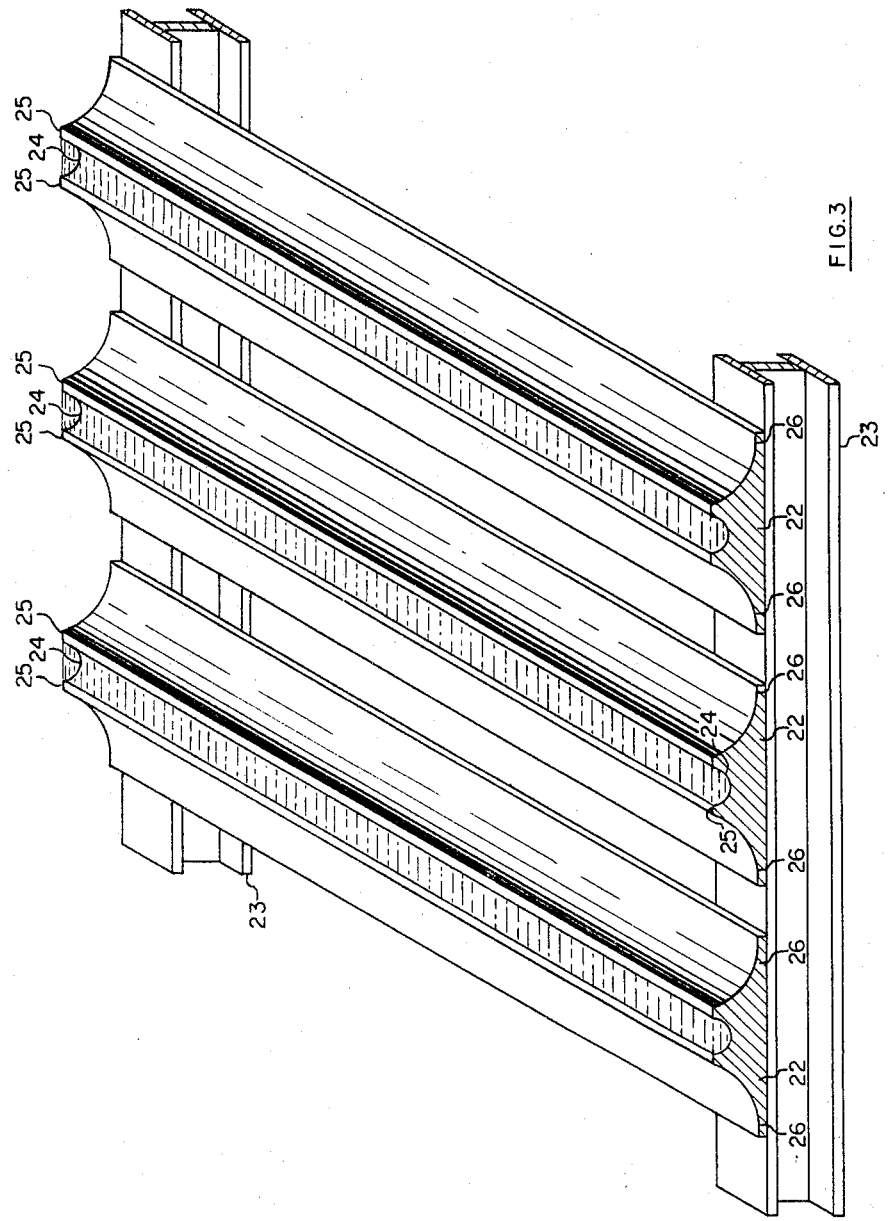

3,440,803
GAS SCRUBBER
Peter M. Wechselblatt, New York, N.Y., assignor to Chemical Construction Corporation, New York, N.Y., a corporation of Delaware
Filed June 2, 1967, Ser. No. 643,098
Int. Cl. B01d 47/06, 47/12, 41/00
U.S. Cl. 55—241
1 Claim

ABSTRACT OF THE DISCLOSURE

An apparatus is provided for scrubbing gas streams with scrubbing liquid to remove a gas stream component. The gas stream is passed downwards through a rectangular conduit. A horizontal grate is disposed within the conduit and extends across the flow path of the gas stream. The grate consists essentially of a plurality of parallel spaced apart horizontal bars which are supported within the conduit in parallel horizontal alignment. Each of the bars is provided with an upper longitudinal recess, side walls which slope outwards in a downwards direction, and lower longitudinal lips which extend outwards at the base of the bar. The juxtaposed lips on adjacent bars define a slit for high velocity gas flow between adjacent bars. A scrubbing liquid such as water is passed into the upper recess of each of the bars, so that the liquid flows over the upper ends of the bars adjacent to the recess, and then flows downwards on the side walls of the bars as a thin liquid film, and is projected transversely into the high velocity gas stream in the slits between bars by the lower lips. In a preferred embodiment, a plurality of horizontal grates are provided in vertical alignment within the conduit, with the bars being aligned in parallel and with the longitudinal recess in each bar of a lower grate being vertically aligned directly below the slit between bars of the next higher grate.

BACKGROUND OF THE INVENTION

Field of the invention

Figure 1:
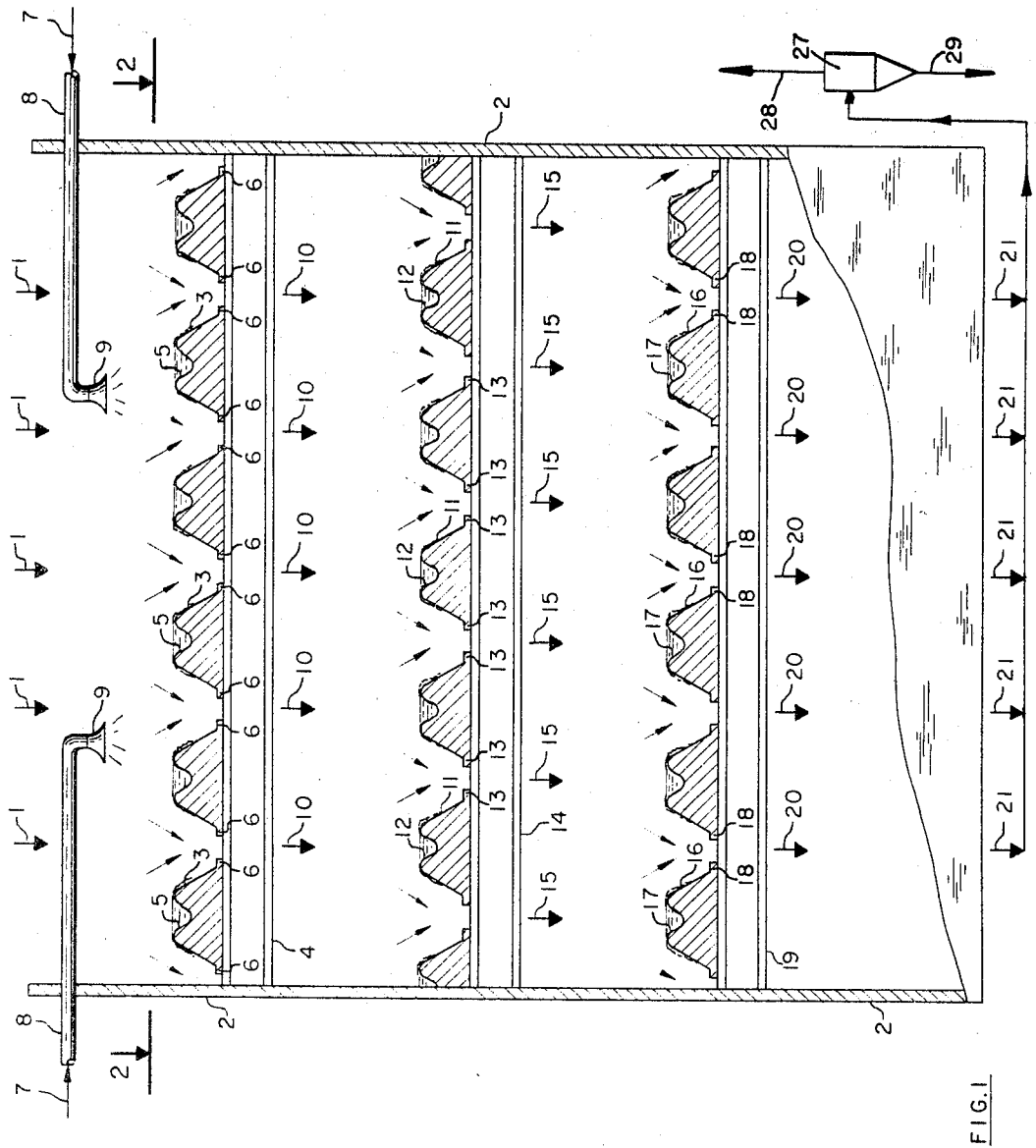

The invention is directed to the art of scrubbing of gas streams with a liquid, for the removal of a component such as entrained solid particles. Numerous facilities such as thermal power plants, incinerators, and chemical or metallurgical process installations generate significant volumes of off-gas or waste gas which contains a component such as entrained solid particles. These gas streams must be treated for removal of entrained solids before discharge to the atmosphere, in order to prevent air pollution. The present invention provides an improved apparatus and means for scrubbing large volumes of gas with a scrubbing liquid, so as to remove entrained solid particles or other components from the gas stream.

DESCRIPTION OF THE PRIOR ART

Numerous apparatus and devices have been proposed for scrubbing a gas stream with a liquid, so as to remove a gas stream component such as entrained solid particles. Various types of gas washers employ spray nozzles, packed sections or baffled towers for this purpose. The acceleration of the gas stream and transverse radial injection of the scrubbing liquid has been proposed in U.S. Patents Nos. 2,604,185 and 2,883,167. Improved circular types of venturi configurations have been provided in U.S. Patents Nos. 3,317,197 and 3,085,793.

One of the major problems in prior art arrangements is encountered in instances when relatively large volumes or large volumetric flow rates of gas must be scrubbed. In most instances, the gas is discharged or evolved from the source at a relatively low pressure head, and thus only small gas pressure drops may be tolerated in the scrubbing facility. In most instances, the prior art apparatus designs require a relatively large pressure drop which must be obtained by the provision of auxiliary blowers or exhausters, or the relatively large gas volumes cannot be efficiently handled with conventional equipment design.

SUMMARY OF THE INVENTION

The present invention relates to an improved gas scrubbing apparatus, in which a horizontal grate essentially consisting of a plurality of parallel bars is disposed in a rectangular conduit through which the gas stream is passed in a downwards direction. A plurality of horizontal grates may be provided in vertical series in some cases, in order to provide more complete gas scrubbing. Each bar is provided with an upper longitudinal recess or trough, side walls which slope outwards in a downwards direction, and lower longitudinal lips which extends outwards at the base of the bar to define slits for high velocity gas flow between adjacent bars. A scrubbing liquid such as water is passed into the upper recess of each of the bars, and flows over the upper ends of the bars adjacent to each recess and downwards on each of the side walls of the bars in the form of a thin liquid film, which is projected transversely into the high velocity gas stream in the slits between bars by the lips. The liquid is thus dispersed into fine droplets, and intimately and uniformly scrubs the gas stream to remove components such as entrained solid particles. The scrubbed gas stream may then be separated from the liquid phase containing solid particles.

The principal advantage of the apparatus of the present invention is that very large gas volumes may be handled and successfully scrubbed for entrained solids removal or elimination of other components, with a relatively low gas pressure drop through the apparatus. Another advantage is that the apparatus units are relatively simple to fabricate and install, and the apparatus may be provided in existing facilities as well as in new facilities or plants. The apparatus is applicable to any type of gas stream containing entrained solid particles, and will also remove entrained liquid droplets such as fog, mist or fume from the gas stream. In some cases the apparatus will also be of benefit in removing objectionable vapors or gaseous compounds such as sulfur dioxide from the gas stream.

It is an object of the present invention to scrub a gas stream with a scrubbing liquid in an improved manner.

Another object is to provide an improved apparatus for removing entrained solid particles from a gas stream.

A further object is to provide an apparatus for scrubbing a gas stream with a scrubbing liquid to remove components such as entrained solid particles, entrained liquid droplets and gaseous constituents from the gas stream.

An additional object is to provide an apparatus for scrubbing large gas volumes with a scrubbing liquid.

Still another object is to provide an apparatus for scrubbing a gas stream with a scrubbing liquid, in which the gas stream flows through the apparatus with low pressure drop.

An object is to provide an apparatus for scrubbing a gas stream with a scrubbing liquid which is readily fabricated and easily installed.

These and other objects and advantages of the present invention will become evident from the description which follows.

DESCRIPTION OF THE DRAWINGS AND PREFERRED EMBODIMENTS

Referring to the drawings,

FIGURE 1 provides a sectional elevation view of a preferred embodiment of the invention, FIGURE 2 is a plan view of FIGURE 1 taken on section 2—2, and FIGURE 3 provides an isometric view of a portion of an alternative embodiment of the gas-liquid contact grate of the present invention.

Referring now to FIGURE 1, the gas stream 1, containing a component or components to be removed by liquid scrubbing, which may include either entrained solid particles, entrained liquid droplets, or a gaseous constituent, or any combination of such components, is passed vertically downwards through the vertically oriented rectangular conduit 2. Stream 1 may be derived from any of the gas sources mentioned supra, or other gas sources producing a gas stream which requires liquid scrubbing before discharge to the atmosphere or further processing. In some instances, a fan or blower, not shown, may be interposed between the gas source and conduit 2, in order to provide greater velocity and pressure head to the gas stream.

A first horizontal grate is disposed in the conduit 2, and consists of the plurality of parallel spaced apart horizontal bars 3. The ends of the bars 3 are supported by the transverse beam 4, which is preferably attached to the conduit 2 and supports the bars 3 in parallel horizontal alignment. Each bar 3 is provided with an upper longitudinal recess 5, which may consist of a trough or groove. The side walls of each bar 3 slope outwards in a downwards direction, and may be flat or, as will appear infra, the side walls may be provided with a concave curvature. The side walls of the bars 3 terminate at lower longitudinal lips 6, which extend outwards at the base of each bar 3. In this embodiment of the invention, the upper surfaces of the lips 6 are horizontal, so that the lips 6 extend outwards horizontally from the base of each of the bars 3. The juxtaposed lips 6 on adjacent bars 3 serve to define a slit for high velocity gas flow between adjacent bars 3.

Scrubbing liquid streams 7, which may consist of water or other suitable scrubbing liquid such as aqueous ammonia solution or liquid hydrocarbon oil, are passed via pipes 8 to spray nozzles 9, and streams 7 are sprayed by nozzles 9 into stream 1 above bars 3. A portion of the sprayed liquid passes into the upper recess in each bar 3, and fills each recess. The excess liquid then flows over the upper ends of the bars 3 adjacent to each recess, and downwards on each of the side walls of the bars 3 in the form of a thin liquid film. The downflowing liquid film is projected transversely into the high velocity gas stream in the slits between bars 3 by lips 6, and is dispersed into the gas stream in the form of liquid droplets which effectively scrub the gas stream and remove components such as entrained solid particles.

The resultant gas streams 10 discharged below beam 4 from the slits between adjacent bars 3 now consists of a scrubbed gas stream containing entrained liquid droplets, with the liquid droplets now containing a component removed from the gas stream. In some instances, the gas stream 10 will have been sufficiently scrubbed for desired purposes such as discharge to the atmosphere, and stream 10 will be passed to gas-liquid separation means, not shown, such as a baffled or cyclonic separator. The scrubbed gas phase from the separator is then discharged to atmosphere, and the liquid phase may be recycled, discharged to waste, or utilized for other purposes.

In most instances, however, further scrubbing of the gaseous phase of stream 10 is desirable. In this case, a second horizontal grate consisting of parallel bars 11 is disposed within conduit 2 vertically below the first grate. The bars 11 are of a shape similar to bars 3. Thus, each of the bars 11 is provided with an upper longitudinal recess 12 and lower longitudinal lips 13, with the lips 13 of adjacent bars 11 serving to define a slit for high velocity gas flow between bars 11. A portion of the entrained liquid droplets in stream 10 falls into each recess 12, so that each recess 12 fills with liquid and a thin liquid film flows downwards across the side wall surfaces of the bars 11 and is projected into the high velocity gas stream by lips 13. The bars 11 are aligned parallel with the bars 3, and the ends of bars 11 are supported by the transverse beam 14. In this embodiment of the invention, each longitudinal recess 12 in a bar 11 is aligned directly and vertically below a slit defined by juxtaposed lips 6 of adjacent bars 3, so that the bars 11 are in staggered relationship relative to bars 3. A plurality of spray nozzles similar to units 9 may be disposed within conduit 2 between beam 4 and bars 11, so as to spray additional scrubbing liquid into stream 10 above bars 11, and to provide additional liquid in each recess 12.

The gas stream 15 discharged below beam 14 from the parallel slits defined by lips 13 now contains entrained liquid droplets, and is subjected to a final scrubbing by passing through the horizontal grate defined by parallel horizontal bars 16, which are disposed within conduit 2 vertically below bars 11. The bars 16 are of a configuration similar to bars 3, thus each bar 16 is provided with an upper longitudinal recess 17 and side walls which slope outwardly and downwardly to lower longitudinal lips 18. The ends of bars 16 are supported by transverse beam 19. The bars 16 are aligned parallel with bars 11, and are preferably oriented vertically below bars 11 in staggered relationship, so that the longitudinal recess in each bar 16 is aligned directly and vertically below a slit defined by juxtaposed lips 13 of adjacent bars 11. A portion of the entrained liquid droplets in stream 15 falls into each recess 17, so that liquid overflows from each recess 17 and over the upper ends of each bar 16, and flows down the side walls of each bar 16 as a thin liquid film which is projected transversely into the high velocity gas stream by lips 18.

The resultant gas stream 20 discharged below beam 19 from the slits between juxtaposed lips 18 now consists of a fully scrubbed gas phase and a liquid droplets phase containing a component or components removed from the gas phase, such as solid particles. Stream 20 passes from conduit 2 via stream 21, which will usually be passed to suitable gas-liquid separating means such as a baffled or cyclonic separator 27. The fully scrubbed and liquid-free gas phase discharged from the separator 27 via stream 28 may now be passed to a discharge stack for release to the atmosphere, or may be employed for any suitable purpose. Thus, in instances when stream 1 consists of off-gas from a basic oxygen steel converter, the gas phase of stream 21 discharged as stream 28 will mainly consist of carbon monoxide and water vapor and may be employed as a fuel or from the chemical synthesis of hydrogen by the water gas shift reaction. The separated liquid phase of stream 21 removed from unit 27 via stream 29 may be discharged to waste, recycled via streams 7, or employed for any suitable purpose.

Referring now to FIGURE 2, a plan view of FIGURE 1 taken on section 2—2 is illustrated. The parallel nature of the bars 3 is evident, as well as the slits between juxtaposed lips 6. Portions of the transverse support beams 4 which support the ends of the bars 3 are also shown in FIGURE 2.

FIGURE 3 is an isometric view of a portion of an alternative embodiment of the gas-liquid contact grate of the present invention. Each bar 22 is supported at each end by a transverse beam 23. The bars 22 are provided with upper central longitudinal recesses 24 and horizontal flat upper ends 25. The concave side walls of each bar 22 terminate tangentially at longitudinal lower lips 26, which define longitudinal slits for contact between the liquid film flowing down from the concave side walls and the high velocity gas stream. Scrubbing liquid is passed into each recess 24 and flows uniformly over each flat upper end 25, and then downwards on the concave side walls of the bars 22 as a thin liquid film.

Numerous alternatives within the scope of the present invention will occur to those skilled in the art, besides those mentioned supra. The gas stream 1 may be generated from any type of process or facility, such as those mentioned supra, and may contain one or a plurality of components which are removed by scrubbing with liquid, such as entrained solid particles, liquid droplets in the form of a mist or fog, or an undesirable vapor or gaseous constituent such as sulfur dioxide. The conduit 2 may be of any suitable rectangular configuration, however the most uniform results in terms of gas flow and scrubbing action are attained when conduit 2 is square in horizontal section.

The bars 3 may be of the configurations shown in FIGURES 1 or 3, or of any suitable configuration which provides an upper longitudinal recess, outwardly and downwardly sloping side walls, and lower longitudinal lips. The bars 3, 11 and 16 are preferably supported by transverse end beams such as 4, 14 and 19, however other suitable support means such as a plurality of brackets may be provided in practice. Additional transverse support beams may be provided under the center of the bars. The bars in each grate will be parallel and substantially horizontal in most cases, however the bars in successive grates may be disposed so as to produce more turbulence in gas flow. Thus, the bars 11 may be transverse or at right angles to the bars 3, or the bars 11 and 16 may be disposed directly under the corresponding bars 3, so that direct linear flow of the gas stream takes place through all of the slits. In this case, each recess 12 and 17 would be directly oriented vertically below a recess 5, and the successive slits defined by lips 6, 13 and 18 would be in a linear vertical orientation. The bars may be of varying sizes in each grate, and the spacing between lips or width of the slits may be altered in successive grates. Alternative means may be provided to pass a scrubbing liquid such as water into the recesses 5, 12 and 17. Thus, individual pipes could be provided to discharge liquid directly into each recess. Finally, more than three grates may be provided in some instances, and in addition the invention may be practiced with less than three grates in some cases.

I claim:

1. An apparatus for scrubbing a gas stream with a scrubbing liquid to remove a component from said gas stream which comprises a vertically oriented rectangular conduit, means to pass said gas stream downwards through said conduit, a first horizontal grate disposed within said conduit, said first grate comprising a first plurality of parallel spaced apart horizontal bars, support means disposed within said conduit to support said first plurality of bars in parallel horizontal alignment, each of said first plurality of bars being provided with an upper longitudinal recess, side walls which slop outwards in a downwards direction, and lower longitudinal lips which extend outwards at the base of the bar, with the juxtaposed lips on adjacent bars of said first plurality of bars serving to define a slit for high velocity gas flow between adjacent bars, said side walls of said first plurality of bars being provided with a concave curvature which terminates horizontally at said lips, with the upper surfaces of the lips on said first plurality of bars being horizontal, whereby said lips extend outwards horizontally from the base of each of said first plurality of bars, a second horizontal grate disposed within said conduit below said first grate, said second grate comprising a second plurality of parallel spaced apart horizontal bars, support means disposed within said conduit to support said second plurality of bars in parallel horizontal alignment, each of said second plurality of bars being provided with an upper longitudinal recess, side walls which slope outwards in a downwards direction, and lower longitudinal lips which extend outwards at the base of the bar, with the juxtaposed lips on adjacent bars of said second plurality of bars serving to define a slit for high velocity gas flow between adjacent bars, said side walls of said second plurality of bars being provided with a concave curvature which terminates horizontally at said lips, with the upper surfaces of the lips on said second plurality of bars being horizontal, whereby said lips extend outwards horizontally from the base of each of said second plurality of bars, said second plurality of bars of said second grate being aligned parallel with said first plurality of bars of said first grate, with the longitudinal recess in each of said second plurality of bars being aligned directly and vertically below a slot defined by juxtaposed lips of adjacent bars of said first grate, means to pass a scrubbing liquid into the upper recess of each of said first plurality of bars and said second plurality of bars, whereby liquid flows over the upper ends of the bars adjacent to each recess and downwards on each of said side walls in the form of a thin liquid film, and is projected transversely into the high velocity gas stream in the slits between bars by said lips, and thereby scrubs said gas stream, and means to separate the scrubbed gas stream discharged below said second grate from scrubbing liquid containing a component removed from said gas stream.

References Cited

UNITED STATES PATENTS

| | | | |
|---|---|---|---|
| 1,822,755 | 9/1931 | Smith et al. | 261—112 |
| 2,604,185 | 7/1952 | Johnstone et al. | |
| 2,627,396 | 2/1953 | Simons. | |
| 2,793,709 | 5/1957 | White | 261—112 X |
| 2,883,167 | 4/1959 | Krantz. | |
| 3,085,793 | 4/1963 | Pike et al. | 261—112 |
| 3,112,352 | 11/1963 | Krantz. | |
| 3,141,910 | 7/1964 | Pearce | 55—257 X |
| 3,168,031 | 2/1965 | Wilhelmsson et al. | |
| 3,317,197 | 5/1967 | Lohner et al. | |

FOREIGN PATENTS

| | | |
|---|---|---|
| 758,997 | 11/1933 | France. |

RONALD R. WEAVER, *Primary Examiner.*

U.S. Cl. X.R.

261—112; 55—257